Figure 1:
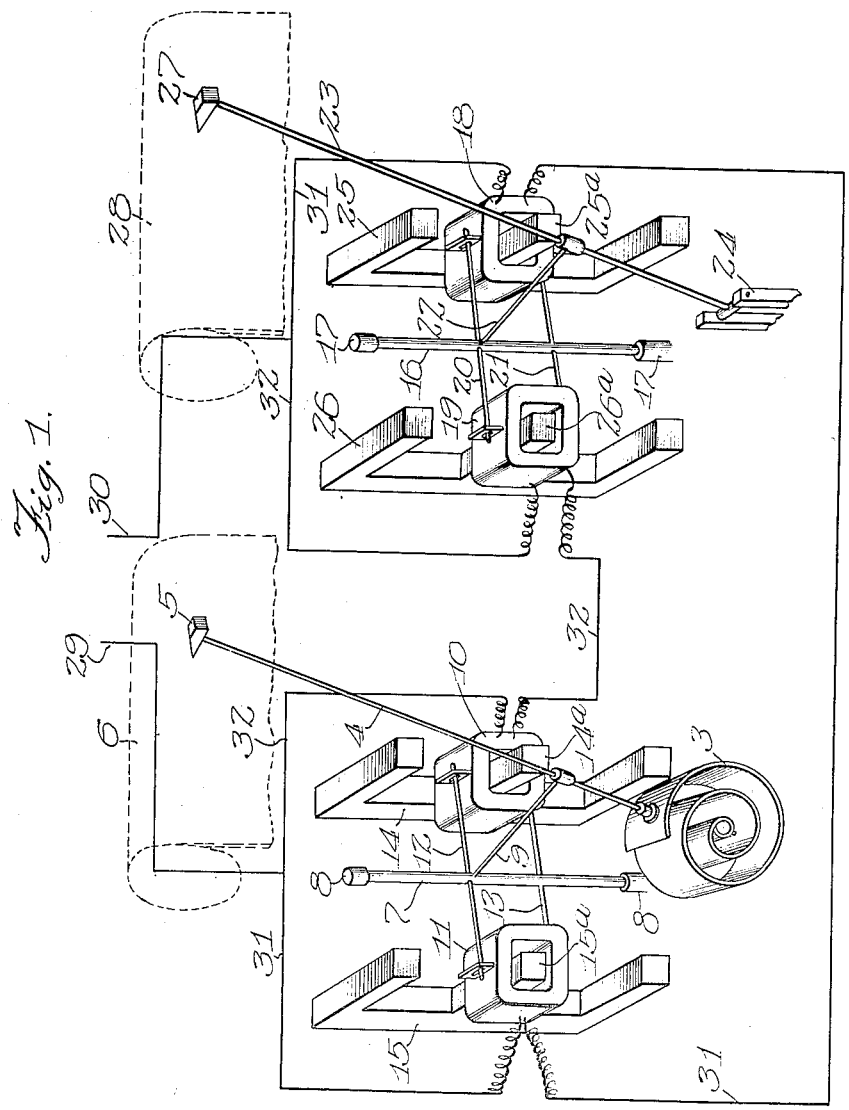

J. W. BARD.
LONG DISTANCE PRESSURE RECORDER.
APPLICATION FILED NOV. 8, 1911.

1,028,851.

Patented June 11, 1912.

2 SHEETS—SHEET 1.

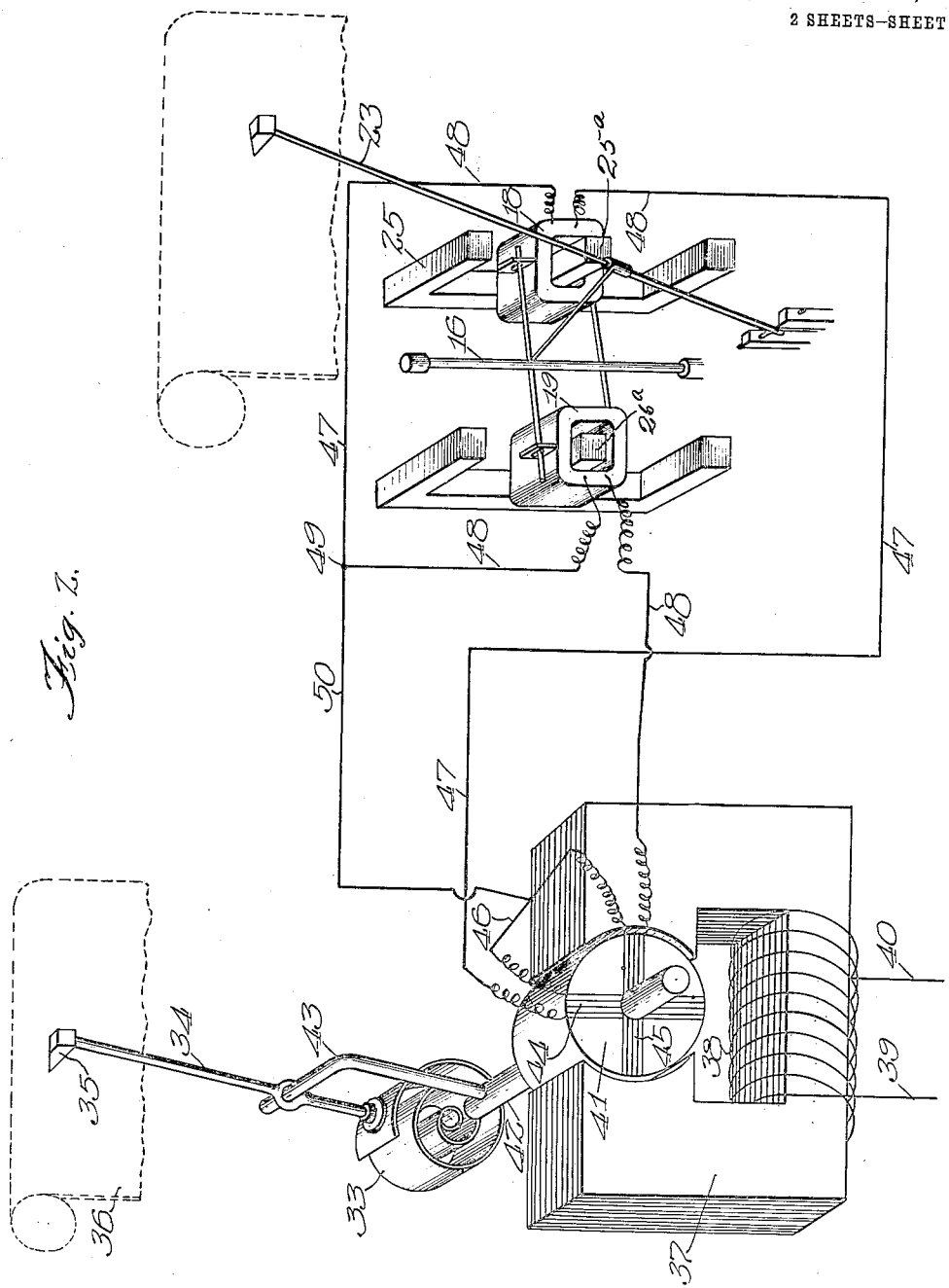

UNITED STATES PATENT OFFICE.

JACOB W. BARD, OF PEORIA, ILLINOIS, ASSIGNOR TO SANGAMO ELECTRIC COMPANY, OF SPRINGFIELD, ILLINOIS, A CORPORATION OF ILLINOIS.

LONG-DISTANCE PRESSURE-RECORDER.

1,028,851.　　　Specification of Letters Patent.　Patented June 11, 1912.

Application filed November 8, 1911. Serial No. 659,253.

*To all whom it may concern:*

Be it known that I, JACOB W. BARD, a citizen of the United States, residing at Peoria, in the county of Peoria and State of Illinois, have invented certain new and useful Improvements in Long-Distance Pressure-Recorders, of which the following is a specification, reference being had to the accompanying drawings.

My invention relates to improvements in devices for recording pressure of vapor or liquids at a point distant from the original indicating device.

As is well-known, there are various instruments used for indicating the pressure of steam, compressed air, or other vapor or liquid, in which the indicating hand, moved by suitable mechanism which is operated by the pressure, indicates the pressure, or, by tracing a line on a chart operated by clock mechanism, gives a continuous record of pressure. Such, for instance, is an instrument of the so-called "Bristol" type, wherein a spiral or coiled metal tube tends to straighten out under the increasing pressure of the vapor or liquid which is conducted to it and, by this straightening out, moves the index hand or recording pen to indicate the pressure, or, in connection with a moving chart traversed by a pen which traces a line on the chart, gives a continuous record of the pressure.

Many attempts have been made to provide mechanism by which the index of the pressure or a continuous record of the pressure on the gage may be made at a point distant from the gage itself, but many difficulties have arisen in such instruments.

It is the object of my invention to provide a simple mechanism, which, by transmitting the indication or record electrically, may enable a record corresponding to the movement of the gage at the point at which pressure is applied to be made at any desired point remote from the original source.

In the drawings,—Figure 1 is a diagrammatic view, illustrating the essential features of my invention, partially in an isometric view; and Fig. 2 is a modification, being a diagrammatic illustration, partly in isometric view, of the essential elements of another form in which my invention is embodied.

Referring to the drawings,—3 is a pressure gage mechanism of the so-called "Bourdon" type, showing, however, only a spiral tube with the index arm attached, as the rest of the parts are well known and understood and form of themselves no part of my invention. The instrument may be of any well-known type, and therefore to illustrate such an instrument in all its parts would unnecessarily encumber the drawings.

4 indicates an index hand, which, in case a moving chart is used, as is shown in the embodiment of my drawings, is supplied with an ink-pen 5 which is adapted to trace a line upon a roll of paper 6, shown in dotted lines in the figure and operated in any well-known manner. By the contraction or expansion of the spiral tube 3 under varying degrees of pressure, the index hand 4 is swung to one side or the other in the well-known and usual manner.

7 indicates a suitable shaft mounted in bearings 8 so as to rotate or rock therein. The shaft, together with the other parts hereinafter described, are, of course, mounted in a suitable casing or support of any well-known and preferred type (not shown), as to do so would only encumber the drawings with unnecessary illustration, and which, of itself, of course, forms no part of my invention.

9 indicates a rod, which is fixed in the shaft 7 and is connected at its other end with the index rod 4 whereby, as the rod 4 is swung to and fro by the action of the tube 3, the shaft 7 is rocked in its bearings. 10—11 indicate solenoids, which, by means of arms 12—13, are carried on the shaft or spindle 7 so as to be swung to and fro with the rocking of the shaft.

14—15 indicate cores, which are preferably provided with three arms, as shown in the drawings, although they may be of other approved form. The central arms 14$^a$—15$^a$ are designed to enter within the solenoids 10 and 11, respectively, so that as the solenoids are swung to and fro the said arms will penetrate a greater or lesser distance into the solenoids.

16 indicates a shaft or spindle, which is mounted in bearings 17, also supported, of course, like the other parts, upon a suitable support or casing.

18—19 indicate solenoids, which by arms 20—21 are suspended from the spindle 16 so that when the solenoids 18—19 are moved upon their cores hereinafter described the spindle 16 is rocked in one direction or the other.

22 indicates an arm fixed at one end on the spindle 16 and connected at the other end with a pointer 23 which is pivoted in a suitable bearings, as 24.

25—26 indicate cores having, respectively, arms 25ᵃ—26ᵃ which enter, respectively, the solenoids 18 and 19. The arm 23, when the instrument is used as a recording instrument, is provided with a pen 27 of any well-known type adapted to bear upon and trace a line upon a suitable roll of paper, as 28, which is moved in any well-known manner. It is obvious that when the solenoids 18—19 are moved in and out upon the projecting arms 25ᵃ—26ᵃ of the cores 25—26 in the manner hereinafter described the shaft 16 will be rocked and thereby the index arm 23 swung in one direction or the other.

29—30 indicate the wires coming from any suitable source of alternating current supply. The wire 29 is connected at its end with wires 31—32 in parallel. The wire 31 is connected with the solenoid 11 and leads away from the solenoid 11 to and from solenoid 18, and thence back to circuit wire 30, connecting the solenoids 11 and 18 in series. The wire 32 is connected with the coil of solenoid 10 and leads from thence to the coil of solenoid 19 and thence back to circuit wire 30, connecting the solenoids 10 and 19 in series. Thus the solenoids 11 and 18 are connected in parallel with solenoids 10 and 19.

The parts are so arranged that when the index arm 4 stands at zero on the chart or on a suitable scale, the solenoids 10 and 11 will be penetrated approximately evenly by arms 14ᵃ—15ᵃ, and the position of the solenoids, therefore, upon the coils will be balanced and approximately the same amount of current will pass through solenoids 10 and 11. The solenoids 19 and 18 are so connected with arm 23 that when they are also in a balanced position the arm 23 will stand at zero. It will, therefore, follow that until one solenoid or the other is moved upon its core the passage of the alternating current through the solenoids will not have any effect upon either arm and both will stand at zero. When, now, the pressure gage is submitted to pressure the arm 4 will be swung to the right, correspondingly rocking the shaft 7 and moving the solenoid 10 more deeply upon the arm 14ᵃ of the core 14. This will cause a greater impedance to the current passing through the solenoid 10, and consequently, through its connection, a greater impedance to the current passing through solenoid 19, causing a lesser amount of current to flow through the circuit 32. The solenoid 11 will be moved farther out upon the arm 15ᵃ of the core 15, causing a lesser impedance and consequently a greater amount of the current to flow through circuit 31 and therefore through solenoid 18. Solenoid 18 will, therefore, be drawn down upon the arm 25ᵃ, causing the index arm 23 to be swung also to the right, corresponding with the movement of the arm 4. As the current, of course, seeks a balance through the circuits, the amount of movement of the arm 4 will be directly communicated to the arm 27 and will cause it to move to a corresponding portion of the scale or to a corresponding portion of the moving chart,—if such chart is used,—as that to which the arm and index 4 moves, and in case the pens 5 and 27 are used, will produce upon the chart 28 a record precisely equal to the record made by pen 5 upon chart 6. It will be obvious that the two portions of my device may be a long distance apart and that thereby the record of the pressure upon the gage at the point at which the pressure is applied may be transmitted and duplicated at a point at practically any desired distance therefrom.

Referring to Fig. 2, the distant part of my apparatus is precisely like that shown in Fig. 1 and is correspondingly numbered. The modification consists of the parts connected with the pressure gage at the place at which the pressure is applied. It will not be, therefore, necessary for me to redescribe the part of my apparatus directly connected with and operated by the pressure gage. In this part, 33 indicates the coil of a pressure gage of any approved type and carrying an index arm 34 which may be provided with a pen 35 to work upon a roll of paper 36 operated in any well-known way. 37 indicates a laminated core, which is energized by windings 38 connected by wires 39—40 with any suitable source of alternating current. 41 indicates a rotor mounted upon a shaft 42 supported, of course, in suitable bearings of any type (not shown). 43 indicates a bent arm, which is mounted at one end in the shaft 42 and is connected at the other end with the index pointer 34, whereby, when the index pointer is swung by the motion of the pressure gage 33, the shaft 42, and consequently the rotor 41, is correspondingly partially rotated in one direction or the other upon its shaft. 44—45 indicate windings upon the rotor 41. These windings are in quadrature and for purposes of proper operation should be distributed around the entire periphery of the rotor 41, but they are shown only diagrammatically as as they are well-understood in the art. 46 indicates a wire connection between the windings 44—45 of the rotor 41. 47 indicates a circuit wire, which leads from the winding 44 to and away from solenoid 18. 48 indicates a circuit wire, which leads from the winding 45 on rotor 41 to and away from solenoid 19. At a suitable point, as 49, it is connected with the wire 50, and the united circuits are connected by the circuit wire 50 with the wire 46 which connects the windings of the rotor 41. It will be obvious that by the magnetic flux between the poles of the core 37 an alternating electric current is set up through one or the other, or both, of the windings 44—45 upon the rotor 41, depending upon the position of the rotor. In the position shown, in which the pens 34 and 23 are moved to the right, the winding 44 is at right angles with the magnetic flux, and consequently the alternating current is generated only through the winding 44. The other winding 45 being parallel with the lines of the magnetic flux, no current will be set up in it.

When the pens are in normal position— that is, at zero point—the rotor will be in such a position that each of the two coils will be equally affected by the magnetic flux between the poles of the core, and the same current will flow through both circuits and through both solenoids 18—19, and they will remain in balanced position upon their respective cores. When, however, the pen is swung to the right so as to bring one coil into a more effective and the other into a lesser effective position, the circuits through the solenoids 18—19 will be equally affected. For instance, if the rotor is turned contra-clockwise forty-five degrees from the position shown in Fig. 1 so that the index arm is at zero position, both coils will be equally affected by the magnetic flux between the poles and an equal current will be caused to flow through the circuits from said coils and through the solenoids 18—19. If, now, the pressure is brought to bear upon the pressure gage 33 and the index arm swung to the right, the coils will be thrown out of their position, the coil 44 will be moved into a position more nearly at right angles and the coil 45 more nearly parallel with the lines of magnetic force. A greater amount of current will, therefore, be caused to flow through the solenoid 18 and less through the solenoid 19, moving the solenoid 18 inward upon its arm 25ª, the solenoid 19 out upon its arm 26ª, rocking the shaft correspondingly. This rocking of the shaft will then be communicated to the arm 23, which will be moved in the same direction and the same amount as the arm 34, and thereby the record of the arm 34 at the place at which the pressure gage is located will be transmitted to the distant arm 23 and a corresponding record produced.

As I have said, it will, of course, be understood that the parts of my device, both at the pressure gage end and at the distant recording end, will be mounted in a suitable casing with suitable supports of any preferred kind. As the same, however, form no part of my invention and will be readily understood, it is believed that to illustrate them would only encumber the drawings and specification with useless illustration and description, and I have, therefore, not illustrated such parts.

That which I claim as my invention, and desire to secure by Letters Patent, is,—

1. The combination with a measuring instrument, of an alternating electric circuit having two branches in parallel, means including members operated by the movement of said measuring instrument to cause respective variation of the impedance in said branches of said circuit, an indicating hand, and mechanism including coils connected respectively with said parallel circuits and operated by the variations of the impedance in the respective branches of said circuit to cause said indicating hand to move with the movements of said measuring instrument.

2. In combination, a measuring instrument, two electric circuits connected in parallel with each other in an alternating current circuit, means including mechanism operated by said measuring instrument to cause relative differences in the impedance of said parallel circuits, an index hand, mechanism including coils in operative relation with said two parallel circuits and connected with said index hand and adapted by the relative variations of the impedance in said circuits to cause movements of said index hand corresponding with the movement of said measuring instrument.

3. In combination, a measuring instrument, two electric circuits connected in parallel with each other in an alternating current circuit, means including members operated by said measuring instrument to cause variations relative to each other of the impedance in said parallel circuits, a pair of solenoids connected one with each of said parallel circuits, cores for said solenoids, an index hand, and connections between said solenoids and said index hand adapted, when said solenoids are moved upon their cores, to move said index hand.

4. In combination, a measuring instrument, a pair of solenoids connected in parallel with each other to a source of alternating current, cores for said solenoids, connections between said solenoids and said measuring instrument adapted by the movements of said measuring instrument to move said solenoids to cover more or less of their respective cores, a second pair of solenoids, cores therefor, electric connections between said first and second pair of solenoids whereby one of each pair is in series with one of the other pair, and the movements of said first solenoids upon their cores will cause corresponding movements of said second solenoids upon their cores, an index hand, and connections between said index hand and said second solenoids whereby said index hand may be rocked by the movements of said solenoids.

5. In combination, a measuring instrument, alternating current circuits, means including mechanism operated by the movement of said measuring instrument to cause relative variation of the electric current in said circuits, mechanism including cores, and coils on said cores connected with said alternating current circuits and adapted by the relative variation of the current flow therein to cause a movement of said coils upon said cores, and an indicating hand connected with said coils to move therewith with the movements of said measuring instrument.

JACOB W. BARD.

Witnesses:
A. P. COLVIN,
T. A. SCHLINK.